United States Patent
Isogai et al.

(10) Patent No.: US 8,779,639 B2
(45) Date of Patent: Jul. 15, 2014

(54) DRIVE APPARATUS FOR HYBRID VEHICLE AND CASE THEREOF

(75) Inventors: Shigetaka Isogai, Nishio (JP); Kazumi Ogawa, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 341 days.

(21) Appl. No.: 13/227,655

(22) Filed: Sep. 8, 2011

(65) Prior Publication Data

US 2012/0061201 A1 Mar. 15, 2012

(30) Foreign Application Priority Data

Sep. 15, 2010 (JP) ................................ 2010-206483

(51) Int. Cl.
*H02K 9/19* (2006.01)
*H02K 5/20* (2006.01)
*B60K 6/405* (2007.10)

(52) U.S. Cl.
USPC ............... 310/54; 310/78; 310/89; 74/606 R; 903/952

(58) Field of Classification Search
USPC .......... 310/54, 58, 89, 78, 216.118; 180/65.1, 180/65.21; 74/606 A, 606 R
See application file for complete search history.

(56) References Cited

U.S. PATENT DOCUMENTS

| | | | |
|---|---|---|---|
| 6,258,001 B1 * | 7/2001 | Wakuta et al. | 475/5 |
| 8,424,415 B2 * | 4/2013 | Reed et al. | 74/606 R |
| 8,471,420 B2 * | 6/2013 | Isogai et al. | 310/71 |
| 2004/0154846 A1 | 8/2004 | Kira | |
| 2008/0258668 A1 * | 10/2008 | Oguri et al. | 318/538 |
| 2009/0021104 A1 * | 1/2009 | Hattori | 310/254 |
| 2009/0100965 A1 * | 4/2009 | Sanji et al. | 74/606 R |
| 2009/0108700 A1 * | 4/2009 | Sakuma et al. | 310/254 |
| 2010/0109461 A1 * | 5/2010 | Kato et al. | 310/90 |
| 2012/0242186 A1 * | 9/2012 | Hattori | 310/216.118 |

FOREIGN PATENT DOCUMENTS

| | | | | |
|---|---|---|---|---|
| DE | 10 2008 025 497 | * | 12/2009 | B60K 6/405 |
| JP | 2004-180477 A | | 6/2004 | |
| JP | 2006-166554 | * | 6/2006 | H02K 5/24 |
| JP | 2009-142031 A | * | 6/2009 | H02K 1/18 |
| JP | 2009-254197 | | 10/2009 | |
| JP | 2009-261214 | | 11/2009 | |

OTHER PUBLICATIONS

Official Action issued on Jan. 21, 2014 by the Japanese Patent Office in Japanese Application No. 2010-206483, and English language translation of Official Action (4 pages).

* cited by examiner

*Primary Examiner* — Burton Mullins
(74) *Attorney, Agent, or Firm* — Buchanan Ingersoll & Rooney PC (57) ABSTRACT

A drive apparatus for a hybrid vehicle, includes an input shaft configured to be rotatably connected to an engine, a motor including a rotor and a stator held inside a stator holder, an output shaft arranged coaxially with a rotation axis of the rotor and connected integrally with the rotor, a clutch device selectively engaging the input shaft with the output shaft, and a case supporting the input shaft and the output shaft, accommodating the motor and the clutch device, and including an oil sump for pooling oil, wherein at least one recessed portion is provided on a peripheral wall portion of the case, at a position where the peripheral wall portion is located lower than a level of the oil pooled in the oil sump and where the peripheral wall portion faces the stator holder.

11 Claims, 5 Drawing Sheets

DRIVE APPARATUS FOR HYBRID VEHICLE AND CASE THEREOF

CROSS REFERENCE TO RELATED APPLICATIONS

This application is based on and claims priority under 35 U.S.C. §119 to Japanese Patent Application 2010-206483, filed on Sep. 15, 2010, the entire content of which is incorporated herein by reference.

TECHNICAL FIELD

This disclosure generally relates to a drive apparatus for a hybrid vehicle and a case thereof.

BACKGROUND DISCUSSION

Various types of known drive apparatuses are suggested for a hybrid vehicle provided with an engine and with a motor as drive units. For example, the drive apparatus including an input shaft rotatably connected to the engine, an output shaft connected to a rotor of the motor so as to be integral with the rotor, and a clutch device connecting the input shaft to the output shaft in a manner that the input shaft engages with and disengages from the output shaft is known. The output shaft is connected to a transmission directly or via a torque converter, and thus a power train leading to drive wheels is established. According to this structure, the vehicle may run only on the engine or only on the motor, or run on both the engine and the motor when a large drive power is needed. Further, due to energy regeneration while the engine is running or the brake is applied, the motor may be used as a generator and a battery may be charged.

According to the above-described structure, the power train may become larger in size and heavy and a cost may increase in case an individual device is structured independently from one another, and therefore the plural devices are generally incorporated in one case. For instance, the clutch device is incorporated in a motor case so that, for example, oil is used commonly for lubricating and for cooling a bearing of the motor and clutch plates, and for actuating a clutch piston. Other structures in which the plural devices are combined are in practical use, one of which is disclosed in JP2004-180477A (hereinafter referred to as Patent reference 1). In order to supply oil, a method to scoop up the oil by means of a rotating object, for example, a gear, a method to pump the oil by using a mechanical oil pump provided at a rotation shaft or an electric oil pump, and other methods are applied.

According to a cooling structure of a motor of a front and rear wheel drive vehicle disclosed in the Patent reference 1, a single casing accommodates a motor, reduction gears and a differential gear, and oil is used commonly for purposes of cooling and lubrication. According to the Patent reference 1, an oil sump is provided at a bottom of the casing. A static oil level of the oil sump is high while the motor is stopped but a dynamic oil level of the oil sump decreases while the motor is running because the oil accumulates in an oil catch tank and in an oil slinger chamber. In a state where the dynamic oil level is decreased, a drag resistance, that is, the resistance caused when the oil is dragged against a viscosity thereof by the rotating motor, is reduced.

According to the Patent reference 1, an amount of the oil contained in the casing is limited by a condition that the dynamic oil level should not inhibit the rotation of the rotor of the motor. Therefore a sufficient amount of oil may not be necessarily assured. This restriction may also exist in other cases where a clutch device is incorporated in a motor case. The amount of the oil is limited in order to reduce the drag resistance of the rotor, and thus a sufficient amount of oil necessary for the operation of the clutch or other purposes may not be assured.

In addition, the oil sump may be divided by components, for example, a stator, arranged in the case of the drive apparatus into a part that includes an oil intake port communicating with an oil pump and other parts that do not include the oil intake port. In this case, the oil level of the part of the oil sump, which includes the oil intake port, reduces to be lower than the oil level of the other parts of the oil sump, which do not include the oil intake port, and thus the oil pump may not pump a sufficient amount of the oil. Further, the oil level may fluctuate by oscillating in the left and the right directions while the vehicle is making a turn, which may be undesirable in terms both an increase in the drag resistance of the rotor and a reduction in an amount of the oil pumped by the oil pump.

The amount of oil contained in the case may be increased by increasing the dimensions of the case of the drive apparatus or by additionally providing a sub tank, however, case having the larger dimensions or the additional sub tank may interfere with peripheral parts and components when the drive apparatus is mounted on the vehicle. In addition, a cost of the drive apparatus may increase.

A need thus exists for a drive apparatus for a vehicle and a case thereof, which is not susceptible to the drawback mentioned above.

SUMMARY

According to an aspect of this disclosure, a drive apparatus for a hybrid vehicle includes an input shaft configured to be rotatably connected to an engine, and a motor including a rotor and a stator. The stator is positioned outwardly relative to the rotor in a radial direction of the motor and is held inside a stator holder which has a flange portion extending in a direction perpendicular to a rotation axis of the rotor. The drive apparatus also includes an output shaft arranged coaxially with the rotation axis of the rotor and connected integrally with the rotor, a clutch device selectively engaging the input shaft with the output shaft, and a case supporting the input shaft and the output shaft in a manner that the input shaft and the output shaft are rotatable about the rotation axis, accommodating the motor and the clutch device, and including an oil sump for pooling oil. The case includes an end face portion to which the flange portion of the stator holder is fixedly attached, and at least one recessed portion is provided on a peripheral wall portion of the case, at a position where the peripheral wall portion is located lower than a level of the oil pooled in the oil sump and where the peripheral wall portion faces the stator holder.

According to a further aspect of this disclosure, the case includes the oil sump for pooling the oil. The case is configured to accommodate the motor including the rotor, the stator and the stator holder which has the flange portion extending in the direction perpendicular to the rotational axis of the rotor and holds the stator, and the end face portion to which the flange portion is fixedly attached. At least one recessed portion is formed on the peripheral wall portion, at the position where the peripheral wall portion is located lower than the level of the oil pooled in the oil sump and where the peripheral wall portion faces the stator holder.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
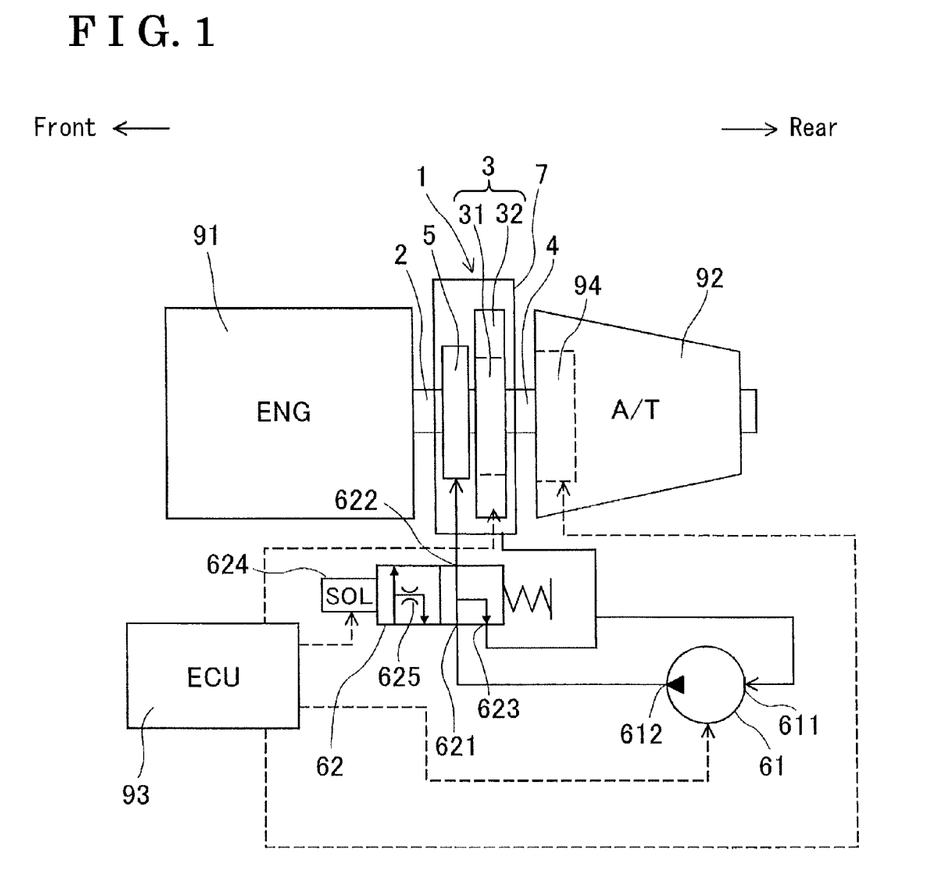
FIG. 1 is a schematic diagram of a power train for a hybrid vehicle, including a drive apparatus for the hybrid vehicle according to an embodiment disclosed here.

A drive apparatus 1 for a hybrid vehicle of an embodiment of this disclosure will be explained with reference to FIGS. 1 to 4. In FIG. 1, a solid arrow indicates a flow of oil and a dashed arrow indicates a flow of control. A power train for the hybrid vehicle is constituted by, for example, an engine (ENG) 91, the drive apparatus 1 for the hybrid vehicle and an automatic transmission (A/T) 92, but not limited thereto. The drive apparatus 1 for the hybrid vehicle is constituted by, for example, an input shaft 2, a motor 3, an output shaft 4, a clutch device 5, an electric oil pump 61 and an electromagnetic valve 62 both for operating the clutch device 5, and a case 7, but not limited thereto. The drive apparatus 1 for the hybrid vehicle is also provided with an electric control unit (ECU) 93 controlling the engine 91, the automatic transmission 92, the motor 3, the electric oil pump 61 and the electromagnetic valve 62. The left side in FIG. 1, where the input shaft 2 of the drive apparatus 1 for the hybrid vehicle is positioned, refers to a front side of the drive apparatus 1 and the right side, where the output shaft 4 is positioned, refers to a rear side of the drive apparatus 1. A radial direction, an axial direction and derivatives thereof refer to those relative to the rotation axis AX of the drive apparatus 1 for the hybrid vehicle. A front direction, a rear direction, a vertical direction, left and right directions and derivatives thereof refer to those of the vehicle on which the drive apparatus 1 is mounted.

As shown in FIG. 1, the input shaft 2 of the drive apparatus 1 for the hybrid vehicle is rotatably connected to the engine 91. The motor 3 includes a rotor 31 and a stator 32 that is arranged so as to be positioned radially outward of the rotor 3. The output shaft 4 is connected to the rotor 31 of the motor 30 so as to be integral with the rotor 31 in a manner that the output shaft 4 and the rotor 31 are arranged on an identical rotation axis. The output shaft 4 is connected to a torque converter 94 and the torque converter 94 is connected to the automatic transmission 92. The torque converter 94, which is provided with a lockup clutch, converts an output torque from the output shaft 4 and transfers the converted torque to the automatic transmission 92 or transfers the output torque from the output shaft 4 to the automatic transmission 92 without converting. An output shaft of the automatic transmission 92 is connected to driven wheels via an axle. The clutch device 5 selectively connects the input shaft 2 with the output shaft 4, that is, in a manner that the input shaft 2 is engageable with and disengageable from the output shaft 4. The case 7, which supports the input shaft 2 and the output shaft 4 accommodates the motor 3 and the clutch device 5, includes an oil sump 85, 86. This embodiment may be implemented regardless of types or structures of the engine 91, which precedes the drive apparatus in terms of flow of power, or the torque converter 94 and the automatic transmission 92, which succeed the drive apparatus in terms of low of the power.

Figure 2:
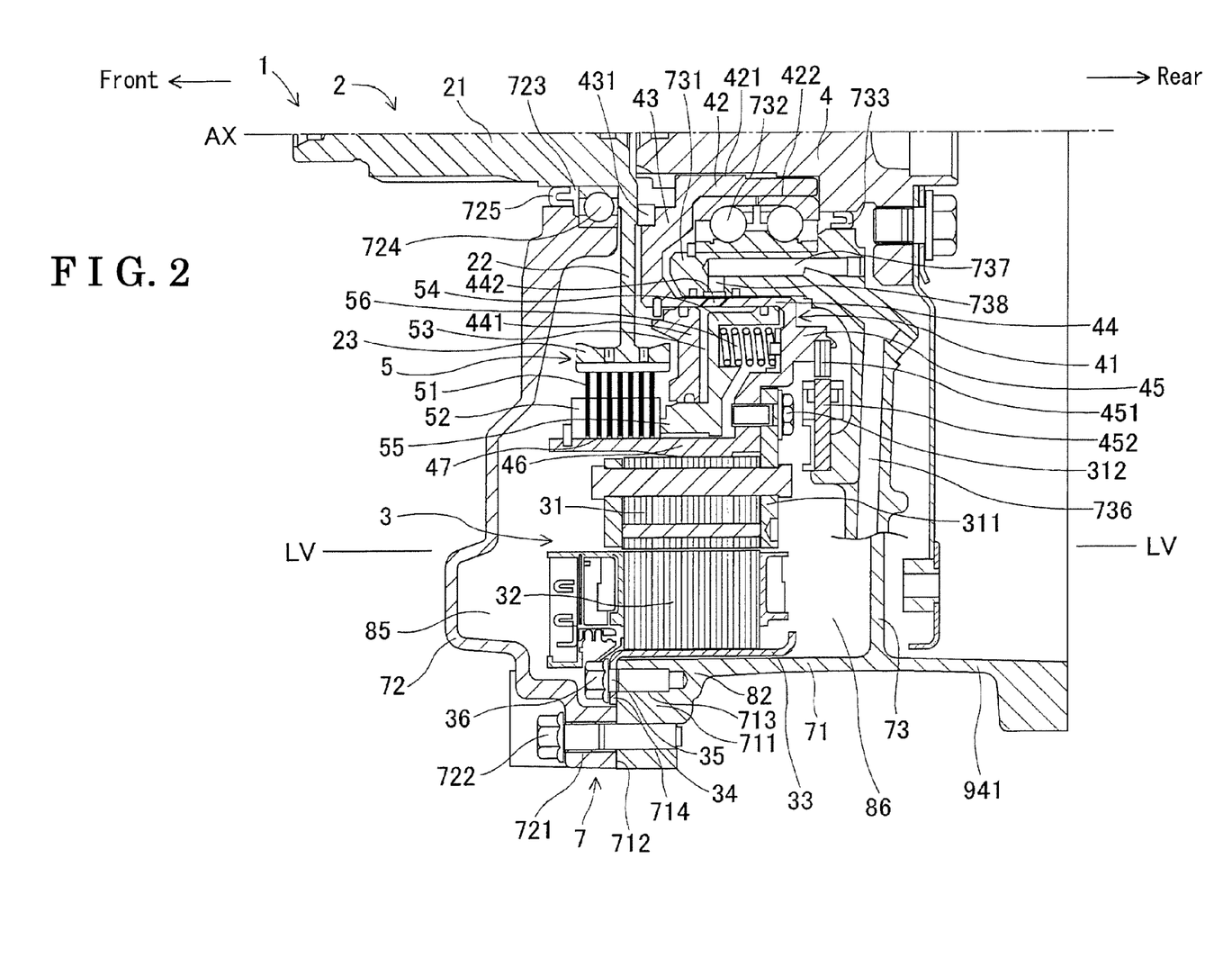
FIG. 2 is a side sectional view illustrating a structure of the drive apparatus for the hybrid vehicle according to the embodiment, including a protruded portion formed at a case.
Figure 3:
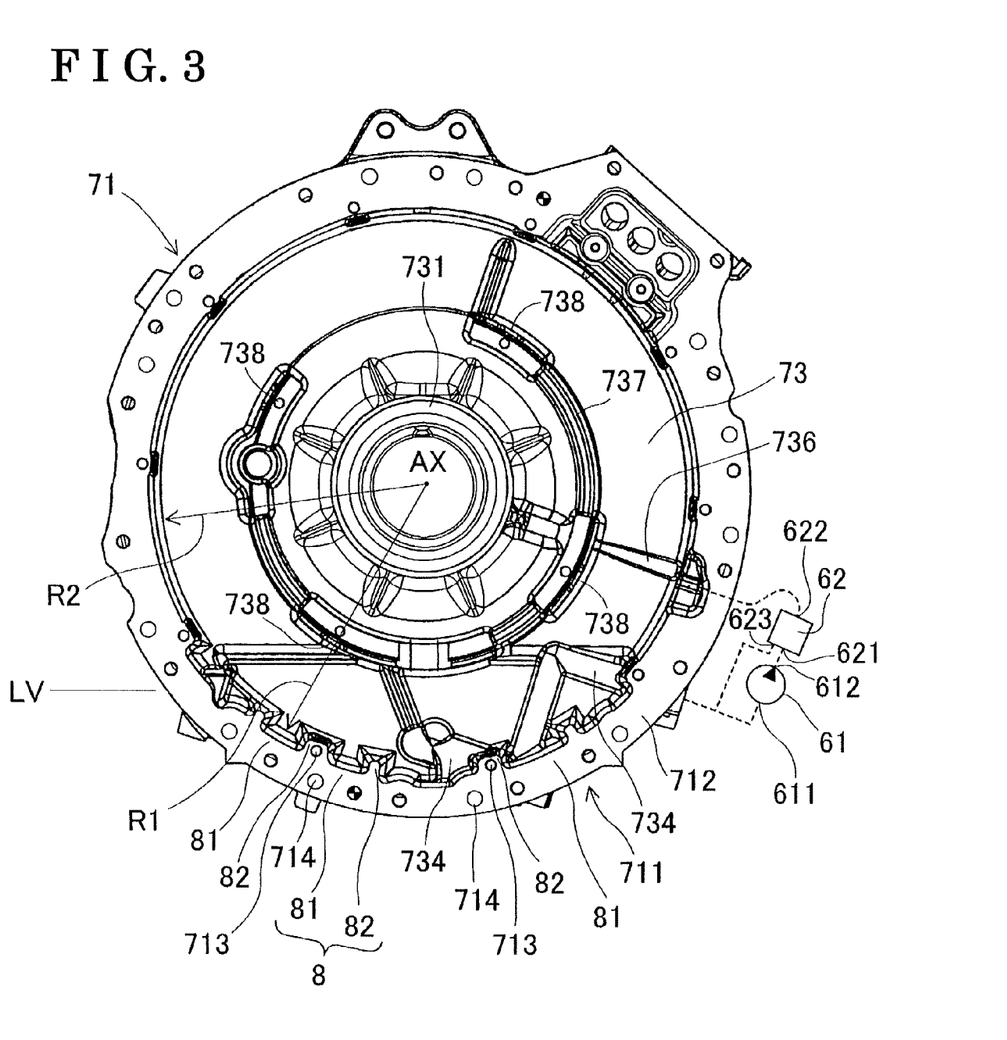
FIG. 3 is a front view illustrating a peripheral wall portion and a rear wall portion which configure the case according to the embodiment.

As shown in FIG. 2, where a lower half of the drive apparatus 1 for the hybrid vehicle below the rotation axis AX thereof relative to the vertical direction of the vehicle is illustrated, the case 7 is constituted by a peripheral wall portion 71, a front wall portion 72 positioned in a vicinity of the input shaft 2, and a rear wall portion 73 positioned in a vicinity of the output shaft 4. As shown in FIG. 3, the peripheral wall portion 71 is formed into a substantially hollow cylindrical shape and is arranged in a manner that an axis of the hollow cylindrical shape extends along the rotation axis AX. The peripheral wall portion 71 includes a recessed-and-protruded portion 8 formed at a lower portion of the peripheral wall portion 71.

Oil for operating the clutch device 5 and lubricating portions to be lubricated is contained and sealed within the case 7. A level LV of the oil pooled in the oil sump 85, 86 is controlled to be at a position of the lowest portion of the rotor 31 in order to reduce a drag loss of the rotor 31 of the motor 3. As shown in FIG. 3, the recessed-and-protruded portion 8 includes a recessed portion 81 and a protruded portion 82 each of which is formed into a substantially rectangular shape and which are alternately arranged with each other along a circumferential direction of the case 7 when viewed from a direction perpendicular to the rotation axis AX. The recessed portion 81 is formed on an inner surface of the peripheral wall portion 71, at a position where the peripheral wall portion 71 faces a stator holder 33 and is located lower than the level LV of the oil. According to the embodiment, the peripheral wall portion 71 is formed with plural recessed portions 81, however, the peripheral wall portion 71 may be formed with at least one recessed portion 81. The protruded portion 82 is formed so as to be interposed between neighboring recessed portions 81 from among the plural recessed portions 81 in a manner that an edge portion of the protruded portion 82 protrudes toward the rotation axis AX of the rotor 31. A radius R2 of the peripheral wall portion 71 at the protruded portion 82 equals to the radius R2 of the peripheral wall portion 71 at portions where the protruded portion 82 is not formed. A radius R1 of the peripheral wall portion 71 at the recessed portion 81 is larger than the radius R2 at the protruded portion 82. The recessed portion 81 and the protruded portion 82 extend in a direction of the rotation axis AX beyond an axial end face of the stator holder 33 in the direction of the rotation axis AX and extend to reach the end face portion 712. The recessed portion 81 and the protruded portion 82 are positioned within an outer diameter of a flange portion 711 provided at the peripheral wall portion 71 and extending in the direction substantially perpendicular to the rotation axis AX of the rotor 31.

Figure 4:
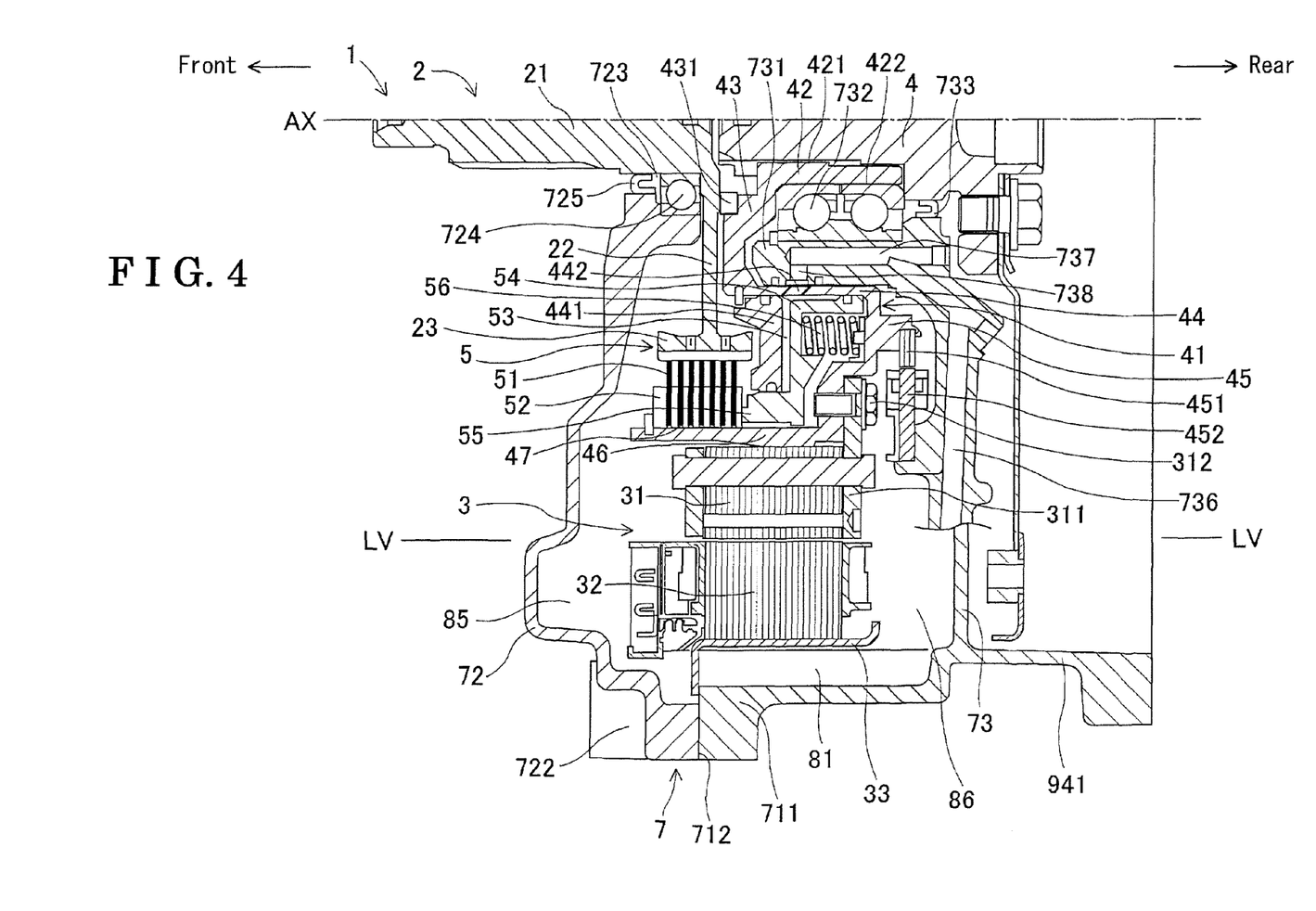
FIG. 4 is a side sectional view illustrating the structure of the drive apparatus for the hybrid vehicle according to the embodiment, including a recessed portion formed at the case.

As shown in FIG. 2, the flange portion 711 is formed at a front portion of the peripheral wall portion 71 so as to extend outwardly in the radial direction. A front portion of the flange portion 711 refers to an end face portion 712. The end face portion 712 includes a stator fixing bolt hole 713 (i.e., a bolt hole) formed at an inner peripheral portion of the end face portion 712 toward the protruded portion 82 of the protruded-and-recessed portion 8. A fixing bolt 36 fixing a flange portion 34 of the stator holder 33 to the end face portion 712 is screwed into the stator fixing bolt hold 713. The end face portion 712 also includes a connecting bolt hole 714 formed at an outer peripheral portion of the end face portion 712 toward the rear direction. FIG. 2 shows the stator fixing bolt hole 713 formed so as to extend toward the protruded portion 82 and the connecting bolt hole 714. FIG. 4, similarly to FIG. 2, shows the lower half of the drive apparatus 1 for the hybrid vehicle below the rotation axis AX thereof relative to the vertical direction of the vehicle.

A rear wall portion 73 extends from the inner surface of the peripheral wall portion 71, in a vicinity of a rear portion of the peripheral wall portion 71, inwardly in the radial direction perpendicular to the rotation axis AX so as to be integral with the peripheral wall portion 71. The rear portion of the peripheral wall portion 71 extends in the rear direction beyond the rear wall portion 73 and constitutes part of a case 941 of the torque converter 94.

The front wall portion 72 is formed into a substantially disc shape including a step portion. The front wall portion 72 includes a loose-fit connection hole 721 formed at an outer peripheral portion of the front wall portion 72 so as to face the connecting bolt hole 714 of the peripheral wall portion 71. A connecting bolt 722 is inserted into the loose-fit-connection hole 721 of the front wall portion 72 and is screwed with the connecting bolt hole 714 of the peripheral wall portion 71, and thus the front wall portion 72 is connected to the peripheral wall portion 71. The front wall portion 72 includes a through hole 723 formed in a vicinity of a radial center of the front wall portion 72. A ball bearing 724 is provided between an inner peripheral surface of the through hole 723 and the input shaft 2. Thus, the front wall portion 72 supports the input shaft 2 in a rotatable manner. Further, an oil sealing portion 725 is provided between the inner peripheral surface of the through hole 723 and the input shaft 2 so as to be positioned forwardly of the ball bearing 723, thereby assuring an oil-tight effect.

A supporting seat 731 extending in the direction of the rotation axis AX is provided in a vicinity of a radial center of the rear wall portion 73. A ball bearing 732 is provided at an inner peripheral surface of the supporting seat 731. Thus, the rear wall portion 73 supports an auxiliary output shaft 41, which will be explained later, in a rotatable manner. Further, an oil sealing portion 733 is provided between the inner peripheral surface of the supporting seat 731 and the output shaft 4 so as to be positioned rearwardly of the ball bearing 732, thereby assuring an oil-tight effect. An internal space of the case 7 is defined by the peripheral wall portion 71, the front wall portion 72 and the rear wall portion 73. A portion of the internal space of the case 7, which is positioned lower than the level LV of the oil, refers to the oil sump 85, 86.

The input shaft 2 is integrally constituted by a shaft portion 21 connected to the engine 91 and supported by the ball bearing 724, a enlarged diameter portion 22 extending from a rear end of the shaft portion 21 outwardly in the radial direction, and a clutch seat 23 extending from an outer peripheral edge of the enlarged diameter portion 22 in the direction of the rotation axis AX.

The motor 3 is constituted in a substantially rotationally symmetric manner about the rotation axis AX. The motor 3 includes the rotor 31 and the stator 32 which is held inside the stator holder 33 having the flange portion 34 extending in a direction substantially perpendicular to the rotation axis AX of the rotor 31 and is positioned radially outwardly of the rotor 31. The flange portion 34 of the stator holder 33 includes an attachment hole 35 formed so as to face the stator fixing bolt hole 713 of the peripheral wall portion 71. The flange portion 34 is arranged in a manner that the flange portion 34 is closely attached to the end face portion 712 of the peripheral wall portion 71. The fixing bolt 36 is inserted into the attachment hole 35 of the stator holder 33 and is screwed with the stator fixing bolt hole 713 of the peripheral wall portion 71, and thus the stator 32 is fixedly attached to the peripheral wall portion 71.

As shown in FIG. 2, the stator 32 divides a lower portion of the internal space of the case 7 into the oil sump 85 (i.e., the front oil sump 85) which is positioned forward relative to the stator 32 and the oil sump 86 (i.e., the rear oil sump 86) which is positioned rearward relative to the stator 32. Actually, however, the front oil sump 85 and the rear oil sump 86 communicate with each other via the recessed portion 81 as shown in FIG. 4.

The rotor 31 of the motor 3 is integrally connected to the auxiliary output shaft 41 arranged on the rotation axis AX. Further, the auxiliary output shaft 41 is integrally connected to the output shaft 4 arranged on the rotation axis AX. Thus, the three components, that is, the rotor 31, the auxiliary output shaft 41 and the output shaft 4, are structured so as to rotate integrally with one another about the rotation axis AX. The output shaft 4 protrudes rearward beyond the rear wall portion 73 and is connected to the torque converter 94. The auxiliary output shaft 41 is formed so that a rotational cross section thereof has a substantially S-shape, and is integrally constituted by an inner cylinder portion 42, an inner enlarged diameter portion 43, an intermediate cylinder portion 44, an outer enlarged diameter portion 45 and an outer cylinder portion 46, which will be explained in details later.

The inner cylinder portion 42 is positioned in an inner-most portion of the auxiliary output shaft 41 in the radial direction so as to be parallel to the rotation axis AX. An inner peripheral surface 421 of the inner cylinder portion 42 is integrally connected to the output shaft 4 and an outer peripheral surface 422 of the inner cylinder portion 42 is rotatably supported by the ball bearing 732 in a vicinity of the rear wall portion 73. The inner enlarged diameter portion 43 extends from a front edge of the inner cylinder portion 42 outwardly in the radial direction. A thrust needle bearing 431 is provided between a front portion of the inner enlarged diameter portion 43 and the enlarged diameter portion 22 of the input shaft 2 so that the input shaft 2 is rotatable relative to the auxiliary output shaft 41. The intermediate cylinder portion 44 extends from a radially outer edge of the inner enlarged diameter portion 43 toward the rear direction. The outer enlarged diameter portion 45 extends from a rear edge of the intermediate cylinder portion 44 outwardly in the radial direction. A resolver rotor 451 is provided at a rear portion of the outer enlarged diameter portion 45 so as to be positioned at an inner peripheral portion of the outer enlarged diameter portion 45 and a resolver stator 452 is provided at the rear wall portion 73. A rotation angle of the rotor 31 is detected between the resolver rotor 451 and the resolver stator 452. The outer cylinder portion 46 extends from a radially outer edge of the outer enlarged diameter portion 45 toward the front direction so as to reach a radially outer portion of the clutch seat 23 of the input shaft 2. The rotor 31 of the motor 3 is provided so as to fit around an outer periphery of the outer cylinder portion 46. An end plate 311 is positioned rearwardly of the rotor 31 and extends inwardly in the radial direction. The end plate 311 is fixed to the rear portion of the outer enlarged diameter portion 45 by means of a fixing bolt 312 so as to be located at an outer peripheral portion of the outer enlarged diameter portion 45.

The clutch device 5 is a multiple disc friction clutch and is structured in an area defined by the intermediate cylinder portion 44, the outer enlarged diameter portion 45 and the outer cylinder portion 46 which constitute the auxiliary output shaft 41 and by the clutch seat 23 of the input shaft 2. Specifically, plural clutch plates 51 each formed into an annular shape are provided at the clutch seat 23 of the input shaft 2 as to stand outwardly in the radial direction. On the other hand, a clutch seat 47 is provided at an inner peripheral surface of the outer cylinder portion 46 of the auxiliary output shaft 41 so as to be positioned in a vicinity of a front portion of the outer cylinder portion 46. Plural pressure plates 52 each formed into an annular shape are provided at the clutch seat 47 so as to stand inwardly in the radial direction. The clutch plates 51 and the clutch plate 52 are arranged alternately with each other in the direction of the rotation axis AX for engaging with and disengaging from each other.

A defining member 441 is provided at an outer peripheral portion of the intermediate cylinder portion 44 of the auxiliary output shaft 41, in a vicinity of the front portion of the intermediate cylinder portion 44. The defining member 441, the intermediate cylinder portion 44, the outer enlarged diameter portion 45 and the outer cylinder portion 46 defined a cylinder space 53 having a substantially annual shape. A piston member 54 formed into a substantially annular shape is provided inside the cylinder space 53 in a manner that an oil-tight effect is assured by means of a sealing material. The piston member 54 is actuated by the oil and moves forward and rearward in the direction of the rotation axis AX. The piston member 54 is biased forward by a biasing spring 56 whose first end is fixed to a front portion of the outer enlarged diameter portion 45. In a normal state where no oil is supplied to the clutch device 5 as shown in FIG. 2, a pressing portion 55 positioned at a front portion of the piston member 54 in a vicinity of an outer peripheral portion of the piston member 54 presses a pressure plate 52, and therefore the clutch device 5 is of a normally-closed type. In other words, in the normal state, the input shaft 2 engages with the output shaft 4 and the vehicle is driven by the engine 91.

The electric oil pump 61 and the electromagnetic valve 62 are provided in order to actuate the clutch device 5 as shown in FIG. 1. An intake port 611 of the electric oil pump 61 is connected to an oil intake passage 734 formed at the rear wall portion 73 as shown in FIG. 3. The oil intake passage 734 communicates with a bottom portion of the recessed portion 81 in the rear oil sump 86 formed at the peripheral wall portion 71, which allows the intake passage 734 to intake the oil. As shown in FIG. 1, a discharging port 612 of the electric oil pump 61 is connected to an inlet 621 of the electromagnetic valve 62. An inside of the electromagnetic valve 62 is branched and a first outlet 622 is connected to an oil supply passage 736 formed at the rear wall portion 73 (refer to FIGS. 2 and 3) and a second outlet 623 is connected to the intake port 611 of the electric oil pump 61.

As shown in FIG. 3, the oil supply passage 736 extends inwardly in the radial direction and communicates with a circumferential oil passage 737 formed at an inside of the supporting seat 731 and extending in a circumferential direction of the supporting seat 731 so as to have a substantially C-shape. An oil supply port 738 opening outwardly in the radial direction is provided at four positions of the circumferential oil passage 737 in a manner that the four oil supply ports 738 are arranged allowing a substantially equal angle between the neighboring oil supply ports 738. As shown in FIG. 2, the oil supply port 738 passes through an oil supply hole 442 formed at the intermediate cylinder portion 44 of the auxiliary output shaft 41 and communicates with the cylinder space 53 positioned forwardly of the piston member 54.

In FIG. 1, a solenoid (SOL) 624 is not energized, and thus the first and the second outlets 622, 623 are opened, and therefore the electromagnetic valve 62 communicates with both the clutch device 5 and the intake port 611 of the electric oil pump 61. Consequently, in case that the electric oil pump 61 operates in this state, the oil does not flow into the clutch device 5 having a resistance but flows back to the intake port 611 of the electric oil pump 61. While the solenoid 621 is energized, a throttle valve 625 is inserted into the second outlet 623. Thus, while the electric oil pump 61 is operating, the oil flows from the rear oil sump 86 to the cylinder space 53 positioned forwardly of the piston member 54. The oil flowing into the cylinder space 53 causes the piston member 54 to move rearwardly against the biasing spring 56, and thus a pressure by a pressing portion 55 is relieved and the clutch device 5 is disengaged, that is, the input shaft 2 is disengaged from the output shaft 4.

While the solenoid 624 of the electromagnetic valve 62 is de-energized and the electric oil pump 61 stops operating, the oil inside the cylinder space 53 is discharged by an action of the biasing spring 56, and thus the clutch device 5 is engaged again. The oil discharged from the cylinder space 53 flows back to the rear oil sump 86 via the electromagnetic valve 62. As explained above, the rear oil sump 86 communicates with the front oil sump 85 via the recessed portion 81, the oil levels of the front and the rear oil sumps 85, 86 are automatically equalized. The front and the rear oil sumps 85, 86 function as a reservoir tank for supplying and discharging the oil for operating the clutch device 5.

Figure 5:
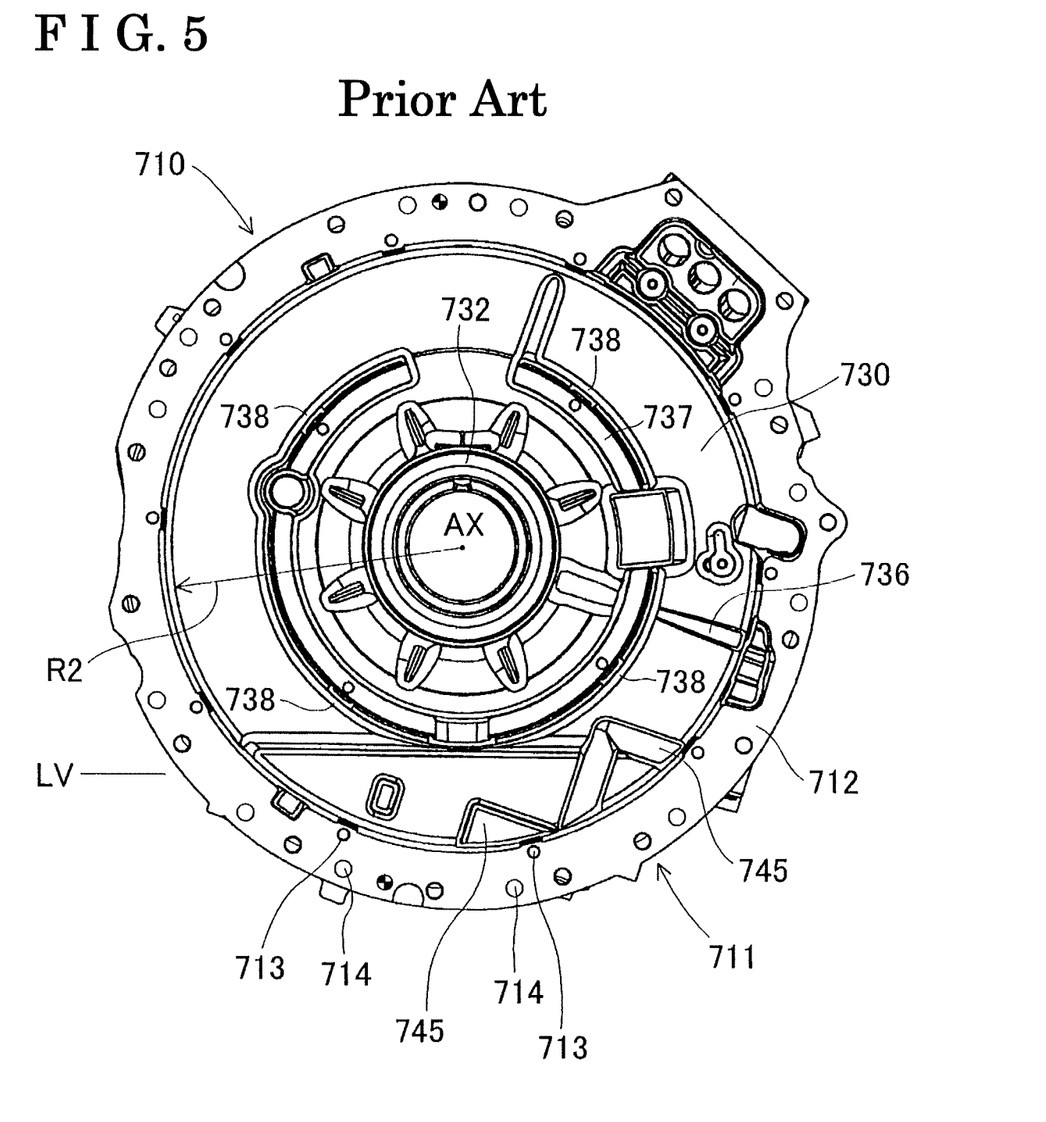
FIG. 5 is a front view illustrating a peripheral wall portion and a rear wall portion which configure a known case.

Next, effects and advantages of the drive apparatus 1 for the hybrid vehicle according to the embodiment, which has the above-explained structure, will be explained in comparison with a known structure. As shown in FIG. 5, a known case, which includes a peripheral wall portion 710 and a rear wall portion 730, is not provided with the recessed-and-protruded portion 8. Thus, according to the known case, the radius R2 of the inner peripheral surface of the peripheral wall portion 710 is constant along the inner periphery of the peripheral wall portion 710 and equals to the radius R2 of the inner peripheral surface of the peripheral wall portion 71 at the protruded portion 82 of the embodiment. In addition, according to the known case, an end of an oil intake passage 745 which communicates with the intake port 611 of the electric oil pump 61 is provided so as to be positioned higher than the bottom portion of the recessed portion 81. Thus, according to the embodiment, an internal volume of the front and the rear oil sump 85, 86 increases by an internal volume of the recessed portion 81, thereby assuring a sufficient amount of the oil necessary for the operation of the clutch device 5 and for other purposes. Further, according to the embodiment, a protrusion is formed on an outer peripheral surface of the peripheral wall portion 71 due to the recessed portion 81 formed on the inner peripheral surface of the peripheral wall portion 71, and thus a surface area of the outer peripheral surface of the peripheral wall portion 71 increases, which is advantageous in cooling the motor 3.

According to the known case, there is no fluid communication provided by the recessed portion 81 the front oil sump 85 and the rear oil sump 86, and thus the front oil sump 85 and the rear oil sump 86 are separated from each other and a flow of the oil therebetween is restricted. To the contrary, according to the embodiment, the front oil front sump 85 and the rear oil sump 86 communicate with each other via the recessed portion 81. Thus, after the oil in the rear oil sump 86 is pumped by the electric oil pump 61, the oil in the front oil sump 85 flows into the rear oil sump 86 via the recessed portion 81. Consequently, according to the embodiment, the electric oil pump 61 may reliably pump up the oil. In addition, according to the embodiment, the recessed-and-protruded portion 8 extends in the direction of the rotation axis AX. Therefore, for example, while the vehicle makes a turn, the oil will pass over the protruded portion 82 and move in the left and right directions inside the case 7. Thus, the protruded portion 82 may restrict the movement of the oil in the left and right directions, stabilize the level LV of the oil, reduce the drag resistance of the rotor 31 and assure an amount of the oil pumped by the electric oil pump 61.

Further, according to the embodiment, the stator fixing bolt hole 713, which is formed at the end face portion 712 of the peripheral wall portion 71 so as to extend toward the protruded portion 82, may be formed at an identical position to that of the known case. Thus, there is no need to change a shape of the stator holder 33. On the other hand, an area of the peripheral wall portion 71, in which the recessed-and-protruded portion 8 is formed, is set within the outer diameter of the flange portion 711, and thus outside dimensions of the case 7 remain unchanged from those of the known case, thereby restricting the case 7 from becoming larger.

In the embodiment, the oil is used for operating the clutch device 5, however, it is not limited thereto. The oil may be used for lubricating the clutch plates 51 and the pressure plates 52, or for lubricating the ball bearings 724, 832. Alternatively, the oil may be used for a combination of the above-explained purposes.

In the embodiment, the recessed portion 81 and the protruded portion 82 of the recessed-and-protruded portion 8 extend parallel to the direction of the rotation axis AX, however, it is not limited thereto. The protruded portion 82 may be arranged, for example, in a form of scattered islands and other portions than the islands may form the recessed portion 81. Other variations and modifications may be made to the embodiment.

According to the embodiment, the drive apparatus 1 for the hybrid vehicle includes the input shaft 2 configured to be rotatably connected to the engine 91, and the motor 3 including the rotor 31 and the stator 32. The stator 32 is positioned outwardly relative to the rotor 3 in a radial direction of the motor 3 and is held inside the stator holder 33 which has the flange portion 34 extending in the direction perpendicular to the rotation axis AX of the rotor 31. The drive apparatus 1 also includes the output shaft 4 arranged coaxially with the rotation axis AX of the rotor 31 and connected integrally with the rotor 31, the clutch device 5 selectively engaging the input shaft 2 with the output shaft 4, and the case 7 supporting the input shaft 2 and the output shaft 4 in a manner that the input shaft 2 and the output shaft 4 are rotatable about the rotation axis AX, accommodating the motor 3 and the clutch device 5, and including the oil sump 85, 86 for pooling the oil. The case 7 includes the end face portion 712 to which the flange portion 34 of the stator holder 33 is fixedly attached, and at least one recessed portion 81 is provided on the peripheral wall portion 71 of the case 7, at the position where the peripheral wall portion 71 is located lower than the level LV of the oil pooled in the oil sump 85, 86 and where the peripheral wall portion 71 faces the stator holder 33.

Consequently, the internal volume of the oil sump 85, 86 increases by the internal volume of the recessed portion 81, thereby assuring the sufficient amount of the oil necessary for the operation of the clutch device 5 and for other purposes. Further, according to the embodiment, the protrusion is formed on the outer peripheral surface of the peripheral wall portion 71 due to the recessed portion 81 formed on the inner peripheral surface of the peripheral wall portion 71, and thus the surface area of the outer peripheral surface of the peripheral wall portion 71 increases, which is advantageous in cooling the motor 3.

According to the embodiment, the recessed portion 81 extends in the direction of the rotation axis AX beyond the axial end face of the stator holder 33 in the direction of the rotation axis AX and extends to reach the end face portion 712 to provide the fluid communication within the oil sump 85, 86 which is separated by the stator 32 into the front oil sump 85 and the rear oil sump 86 in the direction of the rotation axis AX.

Consequently, in case that the level LV of the oil decreases in one of the front oil sump 85 and the rear oil sump 86 which are divided by the stator 33, the oil flows from the other one of the front oil sump 85 and the rear oil sump via the recessed portion 81 so that the level LV of the oil is equalized. Thus, the electric oil pump 61 reliably pumps up the oil regardless of which oil sump a suction port communicating with the oil pump 61 opens to.

According to the embodiment, the end face portion 712 is formed with the stator fixing bolt hole 713 into which the fixing bolt 36 fixing the flange portion 34 is screwed.

Consequently, there is no need to change the shape of the stator holder 33 even in case that the recessed portion 81 is formed. The outer dimensions of the case 7 remain unchanged from those of the known case, thereby restricting the case 7 from becoming larger.

According to the embodiment, the protruded portion 82 of which end portion extends toward the rotation axis AX of the rotor 31 is provided between the neighboring recessed portions 81.

Consequently, for example, while the vehicle makes a turn, the oil will pass over the protruded portion 82 and move in the left and right directions inside the case 7. Thus, the protruded portion 82 may restrict the movement of the oil in the left and right directions, stabilize the level LV of the oil, reduce the drag resistance of the rotor 31 and assure the amount of the oil pumped by the electric oil pump 61.

According to the embodiment, the protruded portion 82 extends in the direction of the rotation axis AX beyond the axial end face of the stator holder 33 in the direction of the rotation axis AX and extends to reach the end face portion 712.

Consequently, the protruded portion 82 extends for a long distance in the direction of the rotation axis AX, and thus the movement of the oil in the left and right directions may be significantly restricted. In addition, the recessed portion 81 and the protruded portion 82 may be formed parallel to each other easily, thereby reducing a manufacturing cost of the case.

According to the embodiment, the case 7 includes the oil sump 85, 86 for pooling the oil. The case 7 is configured to accommodate the motor 3 including the rotor 31, the stator 32 and the stator holder 33 which has the flange portion 34 extending in the direction perpendicular to the rotational axis AX of the rotor 31 and holds the stator 32, and the end face portion 712 to which the flange portion 34 is fixedly attached. At least one recessed portion 81 is formed on the peripheral wall portion 71, at the position where the peripheral wall portion 71 is located lower than the level LV of the oil pooled in the oil sump 85, 86 and where the peripheral wall portion 71 faces the stator holder 33.

Consequently, the internal volume of the oil sump 85, 86 increases because at least one recessed portion 81 is formed on the peripheral wall portion 71, at the position where the peripheral wall portion 71 is located lower than the level LV of the oil pooled in the oil sump 85, 86 and where the peripheral wall portion 71 faces the stator holder 33, which assures the sufficient amount of the oil. In addition, the surface area of the outer peripheral surface of the peripheral wall portion 71 increases, which is advantageous in cooling the motor 3.

According to the embodiment, the protruded portion 82 of which end portion extends toward the rotation axis AX of the rotor 31 is provided between the neighboring recessed portions 81.

Consequently, the protruded portion 82 may restrict the movement of the oil in the left and right directions and stabilize the level LV of the oil.

According to the embodiment, the recessed portion 81 and the protruded portion 82 are positioned within the outer diameter of the flange portion 711 provided at the peripheral wall portion 71 and extending in the direction perpendicular to the rotation axis AX of the rotor 31.

Consequently, the outer dimensions of the case 7 remain unchanged, thereby restricting the case 7 from becoming larger.

According to the embodiment, the recessed portion 81 and the protruded portion 82 are provided parallel to each other along the direction of the rotation axis AX.

Consequently, the recessed portion 81 and the protruded portion 82 may be formed parallel to each other easily, thereby reducing the manufacturing cost of the case.

According to the embodiment, the recessed portion 81 and the protruded portion 82 are arranged alternately with each other in the circumferential direction of the case 7.

Consequently, the movement of the oil in the left and right directions may be restricted, the level LV of the oil may be stabilized and the sufficient amount of the oil may be pumped by the electric oil pump 61.

According to the embodiment, the peripheral wall portion 71 is a cylindrical member arranged in a manner that an axis of the cylindrical member extends along the direction of the rotation axis AX, and includes the recessed portion 81 and the protruded portion 82 which are formed at the lower portion of the peripheral wall portion 71.

Consequently, the movement of the oil in the left and right directions may be restricted, the level LV of the oil may be stabilized and the sufficient amount of the oil may be pumped by the electric oil pump 61.

According to the embodiment, the protruded portion 82 extends in the direction of the rotation axis AX beyond the axial end face of the stator holder 33 in the direction of the rotation axis AX and extends to reach the end face portion 712.

Consequently, the protruded portion 82 extends for the long distance in the direction of the rotation axis AX, and thus the movement of the oil in the left and right directions may be significantly restricted. In addition, the recessed portion 81 and the protruded portion 82 may be formed parallel to each other easily, thereby reducing a manufacturing cost of the case.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive apparatus for a hybrid vehicle, comprising:
   an input shaft configured to be rotatably connected to an engine;
   a motor including a rotor and a stator, the stator being positioned outwardly relative to the rotor in a radial direction of the motor and being held inside a stator holder which has a flange portion extending in a direction perpendicular to a rotation axis of the rotor;
   an output shaft arranged coaxially with the rotation axis of the rotor and connected integrally with the rotor;
   a clutch device selectively engaging the input shaft with the output shaft; and
   a case supporting the input shaft and the output shaft in a manner that the input shaft and the output shaft are rotatable about the rotation axis, accommodating the motor and the clutch device, and including an oil sump for pooling oil; wherein
   the case includes an end face portion to which the flange portion of the stator holder is fixedly attached;
   at least one recessed portion is provided on a peripheral wall portion of the case, at a position where the peripheral wall portion is located lower than a level of the oil pooled in the oil sump and where the peripheral wall portion faces the stator holder; and
   the recessed portion extends in a direction of the rotation axis beyond an axial end face of the stator holder in the direction of the rotation axis and extends to reach the end face portion to provide a fluid communication within the oil sump which is separated by the stator into a front oil sump and a rear oil sump in the direction of the rotation axis.

2. The drive apparatus for the hybrid vehicle according to claim 1, wherein
   the end face portion is formed with a bolt hole into which a fixing bolt fixing the flange portion is screwed.

3. The drive apparatus for the hybrid vehicle according to claim 1, wherein
   a protruded portion of which an end portion extends toward the rotation axis of the rotor is provided between the neighboring recessed portions.

4. The drive apparatus for the hybrid vehicle according to claim 3, wherein
   the protruded portion extends in a direction of the rotation axis beyond an axial end face of the stator holder in the direction of the rotation axis and extends to reach the end face portion.

5. The drive apparatus for the hybrid vehicle according to claim 3, wherein
   the recessed portion and the protruded portion are positioned within an outer diameter of a flange portion provided at the peripheral wall portion and extending in the direction perpendicular to the rotation axis of the rotor.

6. The drive apparatus for the hybrid vehicle according to claim 3, wherein
   the recessed portion and the protruded portion are provided parallel to each other along a direction of the rotation axis.

7. The drive apparatus for the hybrid vehicle according to claim 3, wherein the recessed portion and the protruded portion are arranged alternately with each other in a circumferential direction of the case.

8. The drive apparatus for the hybrid vehicle according to claim 3, wherein
   the peripheral wall portion is a cylindrical member arranged in a manner that an axis of the cylindrical member extends along the direction of the rotation axis and includes the recessed portion and the protruded portion which are formed at a lower portion of the peripheral wall portion.

9. The drive apparatus for the hybrid vehicle according to claim 1 wherein the at least one recessed portion includes a plurality of circumferentially spaced apart recessed portions.

10. A case comprising:
- an oil sump for pooling oil, the case being configured to accommodate a motor including a rotor, a stator and a stator holder which has a flange portion extending in a direction perpendicular to a rotational axis of the rotor and holds the stator; and
- an end face portion to which the flange portion is fixedly attached; wherein
- at least one recessed portion is formed on a peripheral wall portion, at a position where the peripheral wall portion is located lower than a level of the oil pooled in the oil sump and where the peripheral wall portion faces the stator holder; and
- a protruded portion of which an end portion extends toward the rotation axis of the rotor is provided between the neighboring recessed portions.

11. The drive apparatus for the hybrid vehicle according to claim 10, wherein
the protruded portion extends in a direction of the rotation axis beyond an axial end face of the stator holder in the direction of the rotation axis and extends to reach the end face portion.

* * * * *